(12) United States Patent
Cobb

(10) Patent No.: US 10,400,113 B2
(45) Date of Patent: Sep. 3, 2019

(54) WATERCOLOUR PAINT COMPOSITIONS AND THEIR USE

(71) Applicant: Chroma Australia Pty Limited, Mount Kuring-gai, NSW (AU)

(72) Inventor: James Campbell Cobb, Julatten (AU)

(73) Assignee: CHROMA AUSTRALIA PTY LIMITED, Mount Kuring-Gai (AU)

( * ) Notice: Subject to any disclaimer, the term of this patent is extended or adjusted under 35 U.S.C. 154(b) by 86 days.

(21) Appl. No.: 15/519,175

(22) PCT Filed: Oct. 14, 2015

(86) PCT No.: PCT/AU2015/050632
§ 371 (c)(1),
(2) Date: Apr. 14, 2017

(87) PCT Pub. No.: WO2016/058049
PCT Pub. Date: Apr. 21, 2016

(65) Prior Publication Data
US 2017/0240749 A1    Aug. 24, 2017

(30) Foreign Application Priority Data
Oct. 14, 2014  (AU) ............................... 2014904011

(51) Int. Cl.
| | |
|---|---|
| *B05D 3/00* | (2006.01) |
| *B05D 3/10* | (2006.01) |
| *C09D 5/06* | (2006.01) |
| *C09D 133/02* | (2006.01) |
| *C09D 7/61* | (2018.01) |
| *C09D 7/63* | (2018.01) |
| *C08K 3/22* | (2006.01) |
| *C08K 5/053* | (2006.01) |
| *C08K 5/17* | (2006.01) |

(52) U.S. Cl.
CPC ............... *C09D 5/06* (2013.01); *B05D 3/007* (2013.01); *C09D 7/61* (2018.01); *C09D 7/63* (2018.01); *C09D 133/02* (2013.01); *C08K 3/22* (2013.01); *C08K 5/053* (2013.01); *C08K 5/17* (2013.01)

(58) Field of Classification Search
CPC ... C09D 5/06; C09D 7/61; C09D 7/63; C09D 133/02; B05D 3/007; B05D 3/10; B05D 3/107; C08K 5/17; C08K 5/053; C08K 3/22
See application file for complete search history.

(56) References Cited

U.S. PATENT DOCUMENTS

| | | | | |
|---|---|---|---|---|
| 5,131,776 A | * | 7/1992 | Mott ...................... | C09D 11/16 401/196 |
| 5,885,720 A | * | 3/1999 | Fujiwara ................ | D21H 19/12 428/511 |
| 2005/0155517 A1 | | 7/2005 | Uchida | |
| 2008/0194745 A1 | * | 8/2008 | Cobb ....................... | C09D 5/06 524/186 |
| 2008/0207820 A1 | * | 8/2008 | Brust .................... | C09D 11/322 524/507 |
| 2011/0187787 A1 | * | 8/2011 | Fujioka ................... | B41J 2/015 347/20 |

FOREIGN PATENT DOCUMENTS

| | | |
|---|---|---|
| EP | 0466493 | 1/1992 |
| JP | H07145289 | 6/1995 |
| JP | 2001146574 | 5/2001 |
| JP | 2006104459 | 4/2006 |
| WO | WO 1998055553 | 12/1998 |
| WO | WO 2007009161 | 1/2007 |
| WO | WO 2008106146 | 9/2008 |
| WO | WO 2011056384 A1 | 5/2011 |
| WO | WO 2013132439 A1 | 9/2013 |

OTHER PUBLICATIONS

Rohm and Haas, "Acrysol™ I-62, General Purpose Aqueous Pigment-Dispersing Resin for Coatings and Graining Inks," 82BP11 datasheet, Mar. 1994, 4 pages, http://www.dow.com/assets/attachments/business/pcm/acrysol_i/acrysol_i-62/tds/acrysol_i-62.pdf.
Rohm and Haas, "Acrysol™ WS-24, Acrylic Copolymer Dispersion Resin," Technical datasheet, 4 pages, http://www.dow.com/assets/attachments/business/pcm/acrysol ws/acrysol ws-24/tds/acrysol_ws-24.pdf.
International Search Report and Written Opinion for International Application No. PCT/AU2015/050632 dated Dec. 2, 2015. (11 pages).
Examination Report for European Patent Application No. EP15 851040 prepared by European Patent Office dated Mar. 28, 2018. (6 pages).
Australian Examination Report No. 1 for standard patent application; Application No. 2015333592, dated Feb. 25, 2019, 5 pages.

* cited by examiner

*Primary Examiner* — Cachet I Proctor
(74) *Attorney, Agent, or Firm* — Haynes and Boone, LLP

(57) ABSTRACT

Disclosed is an artists' watercolor paint composition comprising, at least one pigment; one or more humectants; a binder selected from one or more alkali soluble polymers; and a pH stabilizer in an amount effective to adjust the mixture to an alkali pH so that the watercolor paint composition is water soluble. Also disclosed are uses of the paint composition in providing watercolor paintings.

8 Claims, No Drawings

WATERCOLOUR PAINT COMPOSITIONS AND THEIR USE

CROSS-REFERENCE TO RELATED APPLICATIONS

This application is a United States national phase application of Patent Cooperation Treaty Application No. PCT/AU2015/050632, filed Oct. 14, 2015, which claims priority to Australian Patent Application No. 2014904011, filed Oct. 14, 2014, the entire disclosures of which are hereby incorporated herein by reference.

TECHNICAL FIELD

The present invention relates to watercolour paint compositions and their use in providing watercolour paintings. In particular, the invention relates to improved artists' watercolour paint compositions, improved methods of providing watercolour paintings and processes of using watercolour paint compositions to provide watercolour paintings with multiple layering of the paint composition.

BACKGROUND OF THE INVENTION

Artists' watercolour paints are an important category of artist paints, and are generally used in a traditional manner.

The composition of an artists' modern watercolour paint includes a mixture of microscopic pigment particles which provide the paint colour, and a vehicle that holds the pigment in suspension, allowing it to be applied to a support (paper, board, canvas etc.) with a brush or the like. Once dry the watercolour paint binds to the support. The vehicle consists mostly of a binder which is traditionally, and still most commonly, gum arabic. The vehicle generally also consists of other additives such as a plasticizer to soften the dried gum arabic and help it redissolve, a humectant to help the paint retain moisture, an extender used to thicken the paint without affecting the colour, and water which dissolves or suspends all the ingredients, carries them onto the support and evaporates when its work is done.

In use, traditional watercolour paints are essentially a slurry of pigment particles floating across the support in gum arabic, which has very poor paint binding properties and thus a negative impact on the light fastness of certain pigments which perform well in other paint types such as oil or acrylic paints.

Watercolour paints made with gum arabic as the binder have been in use for hundreds of years and its methodology is still being passed on by todays water-colourists. The re-solubility of dry water colour on paper, and the like, when more wet colour is applied is used as part of the painting technique, and can sometimes be useful. However, since watercolour is a transparent medium and is used in layers, the re-solubility of the first layer and its propensity to dissolve and discolour subsequent layers can be a problem which is difficult to overcome. Expert and adept water colourists are able to very deftly over paint without disturbing the layer underneath, but students or amateur water colourists find this the most difficult thing associated with watercolour painting that they have to learn. Building up layers in a watercolour painting requires very careful hand control and many amateur water colourists find it difficult to control their hand movements precisely.

In research leading up to the present invention the inventor has identified the need for an improved watercolour paint which behaves like a traditional watercolour paint, but is easier to use to achieve multiple layers in a watercolour painting.

Accordingly, an aim, of at least a preferred form of the present invention, is to provide a watercolour paint composition using modern materials which can be formulated to mimic the behaviour of traditional watercolour, but has the advantage of being easier to use to build up layers of a watercolour painting without re-dissolving the under layer(s) or discolouring subsequent layer(s).

One way to prevent a first layer or an under layer from being re-dissolved is to take an acrylic resin based varnish and spray over the under layer or first layer to fix the paint in place on the support. However, the disadvantage of this technique is that a visible film would be produced over the first layer which is not conducive to further layering of the painting.

SUMMARY OF THE INVENTION

In results leading up to one embodiment of the present invention, the inventor has surprisingly found that, when a watercolour paint composition is formulated with an alkali soluble polymer (such as a waterborne acrylic copolymer with carboxylic acid and hydroxyl functionality) as the binder with a pH stabilizer that does not easily evaporate to maintain an alkali pH, then the resulting watercolour paint is resoluble in water to mimic the effect of the traditional watercolour formed using gum arabic as the binder.

In a first aspect of the invention there is provided a watercolour paint composition comprising, at least one pigment in an effective amount to provide the desired pigmentation; one or more humectants; a binder selected from one or more alkali soluble polymers; and a pH stabilizer in an amount effective to adjust the mixture to an alkali pH so that the watercolour paint composition is water soluble.

Accordingly, in another aspect of the invention there is provided, a watercolour paint composition consisting essentially of at least one pigment in an effective amount to provide the desired pigmentation; one or more humectants; a binder selected from one or more alkali soluble polymers; and a pH stabilizer in an amount effective to adjust the mixture to an alkali pH so that the watercolour paint composition is water soluble.

In another aspect of the invention there is provided a watercolour paint composition as disclosed herein, when used to paint a watercolour painting.

A major advantage of the artists' watercolour paint composition disclosed herein is that it can be applied in a first layer to a support surface (such as paper, board, canvas, wood, bark and the like) and moved with water in the traditional watercolour manner as desired, then sprayed with an aqueous solution of weak acid (such as acetic acid) to neutralise the watercolour paint composition making the first layer of the paint composition instantly water resistant without impeding further layering of the watercolour picture. The excess weak acid solution can then be removed by drying, washing off with water or wiping off with a cloth or tissue so that a subsequent layer or layers of watercolour paint can be added, without re-dissolving or resolubilising the first layer of paint or causing discolouration of the subsequent layer or layers.

The water colourist can use as many layers of the watercolour paint as they choose and "fix" a layer at will, painting over the fixed layer to conceptualise their painting without having to acquire the deftness and swiftness of application which is currently required to complete a watercolour painting without re-dissolving the under layer(s) or discolouring the subsequent layer.

Also disclosed herein is a method of providing a watercolour painting comprising, applying the watercolour paint composition disclosed herein to a support, then applying a sufficient amount of a weak acid to the applied paint composition so as to neutralise the paint composition to provide a water resistant paint composition. One or more layers may be applied to the support such that the outer most layer is neutralised by the weak acid.

Accordingly, in another aspect of the invention, there is provided a method of providing a watercolour painting comprising, applying the watercolour paint composition as disclosed herein to a support to form one or more layers of paint composition having an outer layer of paint composition, applying a sufficient amount of a weak acid so as to neutralise the outer layer of paint composition to provide a water resistant layer of paint composition.

Disclosed herein is a process for fixing a watercolour painting on a support comprising the steps of:
a) applying the watercolour paint composition according to the above aspects to the support to produce a first layer of the watercolour painting;
b) treating the first layer of the watercolour painting with an aqueous solution of a weak acid in an amount effective to neutralise the first layer of watercolour paint composition and make it water resistant without leaving a visible film;
c) removing the excess weak acid; and
d) optionally repeating steps a) to c) to build up subsequent layers of the watercolour painting.

Accordingly, in yet another aspect of the invention, there is provided a process of fixing a watercolour painting comprising the steps of:
a) applying the watercolour paint composition according to the above aspects to a support to produce one or more layers of the watercolour paint composition having an outer layer of paint composition;
b) treating the outer layer of the watercolour paint composition with an aqueous solution of a weak acid in an amount effective to neutralise the outer layer of watercolour paint composition to provide a water resistant paint composition;
c) removing any excess weak acid; and
d) optionally repeating steps a) to c) to build up subsequent layers of the watercolour paint composition to form the watercolour painting.

An advantage of the above method is that in step b) the watercolour paint composition is neutralised without leaving a visible film.

In one embodiment of the above disclosed methods, treating the first layer or outer layer in step b) is achieved by spraying an aqueous solution of a weak acid.

In one embodiment of the invention the watercolour paint composition comprises a pH stabilizer that does not evaporate but remains in the paint composition allowing the paint composition to remain water soluble until it is treated with a weak acid, after which the paint composition is fixed and becomes water resistant.

In another embodiment of the invention the watercolour paint composition comprises a pH stabilizer which slowly evaporates over a period of at least one day. The advantage of watercolour paint compositions disclosed herein comprising a slow evaporating pH stabilizer is, after application the water colourist can choose to leave the watercolour painting for a sufficient period of time to evaporate the pH stabilizer thereby fixing the under layer before building up subsequent layers of the painting. Alternatively, the water colourist may choose to speed the evaporation time by drying the paint composition with heat, such as from a blow dryer.

Accordingly, in another aspect of the invention there is provided a method of providing a watercolour painting comprising, applying the watercolour paint compositions disclosed herein to a support, and allowing the applied paint composition to dry for a sufficient period of time to evaporate the pH stabilizer from the paint composition to provide a water resistant paint composition.

In a preferred embodiment, the paint is dried under normal temperature and pressure for at least one day.

DESCRIPTION OF THE PREFERRED EMBODIMENTS OF THE INVENTION

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Throughout this specification the term "consisting essentially of" is intended to exclude elements that would materially affect the properties of the claimed composition or steps of the claimed method.

It will be understood that the watercolour paint composition disclosed herein does not include an organic solvent. It will also be understood that the watercolour paint composition contains only one binder, being an alkali soluble polymer in a binding effective amount.

Throughout this specification the term "acid number" is defined as the mass of potassium hydroxide (KOH) in milligrams that is required to neutralize one gram of chemical substance (alkali soluble polymer).

Throughout this specification the term "glass transition temperature (Tg)" is defined as the temperature region where the polymer transitions from a hard, glassy material to a soft, rubbery material.

Alkali Soluble Polymers

As used herein, the term "alkali soluble polymer" means a polymer which is capable of being solubilised at ambient temperature and pressure in an aqueous solution where the pH is alkaline. The solubilisation pH of the alkali soluble polymer is generally in the order of from about 7 to about 11. Preferably the solubilisation pH is in the order of from about 7.5 to about 10, more preferably about 7.5 to about 9.5. An alkali soluble polymer has at least one acidic or anion producing group. Examples of anion producing groups include but are not limited to carboxylic, hydroxyl, phenolic hydroxyl, active imido and sulphonamide.

The alkali soluble polymer functions as the binder in the watercolour compositions disclosed herein and is not a conventional ingredient in watercolour artists' paint compositions.

More generally, the alkali soluble polymers suitable for use in the watercolour compositions of the invention are polymers that contain sufficient acid functionality and low enough molecular weights to dissolve in an aqueous media when neutralized with base. They act as a dispersant (i.e. reduce the surface tension of the aqueous medium). In particular, they may also assist with pigment dispersion and stabilizing the overall formulation.

Suitable alkali soluble polymers include esters of acrylic acid and methacrylic acid copolymerized with carboxylic acid monomers, copolymers of styrene and acrylic acid with optional alpha-methyl styrene, styrene/maleic anhydride copolymers, and the like.

In one embodiment, the alkali soluble polymers are based on one or more of the group of polymers consisting of acrylic polymers, acrylic copolymers, styrene polymers and styrene acrylic copolymers.

The alkali soluble polymer disclosed herein may have a molecular weight in the range of about 1,000 to about 100,000 Dalton and an acid number of about 70-250. In particular embodiments the alkali soluble polymer has a molecular weight of from 1,000-5,000, 5000-10,000; 10,000-15,000, 15,000-20,000, 20,000-25,000, 25,000-30,000, 30,000-35,000, 35,000-40,000, 40,000-45,000, 45,000-50,000, 50,000-55,000, 55,000-60,000, 60,000-65,000, 65,000-70,000, 70,000-75,000, 75,000-80,000, 80,000-85,000, 85,000-90,000, 90,000-95,000, or 95,000-100,000 Dalton and an acid number of about 70-100, 100-150, 150-200, or 200-250.

In one embodiment, the watercolour paint composition disclosed herein comprises an alkali soluble polymer with a molecular weight of about 15,000 Dalton. In another embodiment, the alkali soluble polymer has a molecular weight of about 30,000 Dalton.

In yet another embodiment, the alkali soluble polymer has a molecular weight of about 35,000 Dalton.

In one form, the watercolour paint composition disclosed herein comprises an alkali soluble polymer with an acid number of about 100. In another form, the alkali soluble polymer has an acid number of about 80. In another form, the alkali soluble polymer has an acid number of about 130. In yet another form, the alkali soluble polymer has an acid number of about 160.

In one form, the alkali soluble polymer is a waterborne acrylic copolymer containing carboxylic acid and hydroxyl functional monomers. In one embodiment the waterborne acrylic copolymer with carboxylic acid and hydroxyl functional monomers is a colloidal dispersion comprising 49-51% solids and 49-51% water with a pH of from 2.5-3.5. The colloidal dispersion may comprise about 50% solids, have a pH of about 3, a glass transition temperature (Tg) of about 45° C. and an acid number of about 100. The colloidal dispersion may also comprise about 50% solids, have a pH of about 3.5, a glass transition temperature (Tg) of about 45° C. and an acid number of about 100. Alternatively, the colloidal dispersion may comprise about 30% solids, have a pH of about 3.5, a glass transition temperature (Tg) of about 45° C. and an acid number of about 100.

In one preferred form the alkali soluble polymer has a molecular weight of about 15,000; a pH of about 3.0; an acid number of about 100; and a glass transition temperature (Tg) of about 45° C. Such an alkali soluble polymer is commercially available under the name Acrysol I-62 or Rhoplex I-62A.

In another form, the alkali soluble polymer may be a styrene acrylic copolymer colloidal dispersion comprising about 48% solids with a pH of about 3, a glass transition temperature (Tg) of about 73° C. and an acid number of about 160. In another embodiment, the alkali soluble polymer is a styrene acrylic copolymer colloidal dispersion with a pH of from 5.6-6.4 (typically about 6), a glass transition temperature (Tg) of about 10° C. and an acid number of about 130.

In yet another form, the alkali soluble polymer may be a carboxylated acrylic copolymer colloidal dispersion comprising about 50% solids with a pH of about 2.5, a glass transition temperature (Tg) of about 105° C. and an acid number of about 136. The carboxylated acrylic copolymer colloidal dispersion may also have a glass transition temperature (Tg) of about 125° C. and an acid number of about 130.

In one embodiment, the alkali soluble polymer is an aqueous solution based on a carboxylated acrylic copolymer comprising about 30% solids with a pH of about 8.3, a glass transition temperature (Tg) of about 35° C. and an acid number of about 80.

Suitable commercially available alkali soluble polymers are flexographic ink polymers such as those manufactured by Dow Chemical Company under the names Acrysol I-62, Lucidene™ 361 and Lucidene™ 198 M, Rhoplex I-98, Rhoplex I-94 and Rhoplex I-62A. Also suitable are Glascol™ LE 520 and LE 530 DispexUltra PA 4516 (former Glascol LS16, renamed in 2012) manufactured by Ciba Specialty Chemicals and Joncryl 142, Joncryl 652™ (former Glascol LE520, renamed in 2010) manufactured by BASF.

In one embodiment the alkali soluble polymer is the commercially available alkali soluble polymer manufactured by Dow Chemical Company under the name Acrysol I-62.

The amount of alkali soluble polymer may be in the range of about 5 kg/100 L-70 kg/100 L. The alkali soluble polymer may be about: 10 kg/100 L, 15 kg/100 L, 20 kg/100 L, 25 kg/100 L, 30 kg/100 L, 35 kg/100 L 40 kg/100 L, 45 kg/100 L, 50 kg/100 L, 55 kg/100 L, 60 kg/100 L, 65 kg/100 L or 70 kg/100 L.

In one embodiment, the alkali soluble polymer is Acrysol I-62 which is available as a 50% solid dispersion in water. Hereinafter, reference to the "wet" content of the alkali soluble polymer is a reference to the % solid content in water (e.g. 50% solids content for Acrysol I-62), and the "dry" content is a reference to the actual amount of alkali soluble polymer present. In another embodiment, the alkali soluble polymer is Acrysol I-62 and is present in a range of about 10 kg/100 L-40/100 L (wet content), which is equivalent to about 5 kg/100 L-20/100 L (dry content) of alkali soluble polymer. In another embodiment, the alkali soluble polymer is Acrysol I-62 which is present in a range of about 15 kg/100 L-35 kg/100 L (wet content), which is equivalent to about 7.5 kg/100 L-17.5 kg/100 L (dry content) of alkali soluble polymer.

For a paint composition with a feel similar to traditional watercolour artists' paint the amount of alkali soluble polymer is generally about 10 kg/100 L-about 20 kg/100 L.

Acrysol I-62 has a thickening effect when in high concentration (such as about 70-80 kg/200 L wet).

It will be appreciated that the amount of alkali soluble polymer used may vary when different pigments are used and that this would be easily determined by a person skilled in the art.

pH Stabilizer

As used herein, the term "pH stabilizer" means a non-volatile alkali or amine compound which is present in an effective amount to adjust the pH of the alkali soluble polymer to an alkaline pH so that the watercolour paint composition disclosed herein is resoluble in water.

The term "non-volatile" as used herein is defined as a substance that is not easily evaporated at normal temperature and pressure. More specifically, "non-volatile" will be understood to include the range of substances: that do not evaporate at normal temperature and pressure to substances that evaporate slowly, over a period of at least one day, at normal temperature and pressure. It will be understood that the pH stabilisers disclosed herein are substances that have a boiling point of at least about 100° C. or greater.

Normal temperature and pressure will be understood to be approximately 298K and $1.013 \times 10^5$ N/m² (1 atm).

The phrase "at least one day" will be understood to mean at least about 12 hours. In other embodiments, "at least one day" will be understood to mean greater than about 12 hours, about 12-120 hours, about 12-96 hours, about 12-72 hors, about 12-48 hours, about 12-48 hours, about 12-24 hours or about 12-15. hours.

In one embodiment the pH stabilizer has a boiling greater than about 400° C.

In another embodiment the pH stabilizer has a boiling in the range of about 100-400° C. In other embodiments the pH stabilizer has a boiling in the range of about: 150-400° C., 160-400° C., 170-400° C., 180-400° C., 180-400° C., 200-400° C., 220-400° C., 240-400° C., 260-400° C., 280-400° C., 300-400° C., 320-400° C., 340-400° C., 360-400° C., 380-400° C., 150-350° C., 160-350° C., 170-350° C., 180-350° C., 180-350° C., 200-350° C., 220-350° C., 240-350° C., 260-350° C., 280-350° C., 300-350° C., 320-350° C., 340-350° C., 150-300° C., 160-300° C., 170-300° C., 180-300° C., 180-300° C., 200-300° C., 220-300° C., 240-300° C., 260-300° C., 280-300° C., 150-250° C., 160-250° C., 170-250° C., 180-250° C., 180-250° C., 200-250° C., 220-250° C., 240-250° C., 150-200° C., 160-200° C., 170-200° C., 180-200° C., 180-200° C., 150-180° C., 160-180° C., 170-180° C.

In one embodiment the pH stabilizer has a boiling point of at least 100° C. In another embodiment the pH stabilizer has a boiling point of at least 110° C. In another embodiment the pH stabilizer has a boiling point of at least 120° C. In another embodiment the pH stabilizer has a boiling point of at least 130° C. In another embodiment the pH stabilizer has a boiling point of at least 140° C. In yet another embodiment the pH stabilizer has a boiling point of at least 150° C. In still another embodiment the pH stabilizer has a boiling point of at least 160° C.

The pH stabilizer is herein described as "non-volatile" in the sense that it has a boiling point ≥100° C. and does not easily evaporate at normal temperature and pressure, and includes within its scope pH stabilizers that do not evaporate and pH stabilisers that evaporate slowly, such as over a period of at least one day. By way of example, if a volatile pH stabilizer, such as ammonia, was used to adjust the pH of the alkali soluble polymer then the pH stabilizer would evaporate too rapidly leaving a waterproof film over the watercolour paint composition. This would not be suitable for a watercolour paint composition. In practice, a water colourist may expect to be able to leave a watercolour paint for a period of time in a pan to dry out and simply come back and add water with a wet brush to re-solubilize the paint and continue painting.

According to one embodiment of the present disclosure, the pH stabililser does not evaporate at normal temperature and pressure and remains permanently in the paint film. Examples of such pH stabilisers include potassium hydroxide and sodium hydroxide.

According to another embodiment of the present disclosure, the pH stabililser evaporate slowly at normal temperature and pressure over a period of at least one day and remain in the paint film for at least a day or more. Examples include alcohol amines Accordingly, it is within the scope of the invention disclosed herein to use a pH stabilizer which slowly evaporates over a period of at least one day. The advantage of using a pH stabilizer which slowly evaporates is that in practice the water colourist can apply the paint composition to the support and leave it to dry over a sufficient time period to evaporate the pH stabilizer thereby avoiding the need to spray the painting with a weak acid solution in order to fix the under layer before building up subsequent layers of the painting. Watercolour compositions comprising pH stabilizers which slowly evaporate over a period of at least one day are stored in tubes rather than pans to avoid the paint irreversibly drying out when not in use.

Accordingly, in one form, the pH stabilizer evaporates slowly over a period of one or more days. In another form, the pH stabilizer does not evaporate after any length of time.

Suitable pH stabilizers include sodium hydroxide, potassium hydroxide, sodium carbonate, sodium bicarbonate, and alcohol amines such as aminomethylpropanol (AMP), monoethanolamine (MEA), diethanolamine (DEA) and triethanolamine (TEA) and mixtures thereof.

In one embodiment the pH stabilizer is sodium hydroxide and/or potassium hydroxide. In another embodiment the pH stabiliser is potassium hydroxide.

In another embodiment the pH stabiliser is sodium carbonate and/or sodium bicarbonate.

In yet another embodiment the pH stabilizer is aminomethylpropanol (AMP), monoethanolamine (MEA), diethanolamine (DEA), or triethanolamine (TEA).

In one form the pH stabilizer is used in a sufficient amount to adjust the pH of the watercolour paint composition to a range of from about 7 to about 11. In another form, the pH stabilizer is used in a sufficient amount to adjust the pH of the watercolour paint composition to a range of from about 7.5 to about 10. In another form, the pH stabilizer is used in a sufficient amount to adjust the pH of the watercolour paint composition to a range of from about 7.5 to about 9.5. In another form, the pH stabilizer is used in a sufficient amount to adjust the pH of the watercolour paint composition to a range of from about 8.5 to about 9.6. In yet another form, the pH stabilizer is used in an amount sufficient to adjust the pH of the watercolour paint composition to about 9.

In one embodiment the pH stabilizer is added in an amount of from about 1 kg to about 2 kg per 100 L of the watercolour paint composition.

In other embodiments the pH stabiliser is potassium hydroxide in an amount to adjust the pH to about: 7-11, 7-10, 7-9, 7-8, 7.5-11, 7.5-10.5, 7.5-10, 7.5-9.5, 7.5-9, 7.5-8, 7.5-8.5, 7.5-8, 8-11, 8-10.5, 8-10, 8-9.5, 8-9, 8-8.5, It is well within the skill of the addressee to choose any appropriate pH stabilizer and determine the amount to be used using routine trial and experimentation.

Humectant

One or more humectants may be used in the watercolour paint composition disclosed herein. It will be understood that conventional humectants used in watercolour paints may be used including but not limited to triols including glycerol, 1,2,6-hexanetriol, trimethylolpropane, alkoxylated triols, saccharides and sugar alcohols; and diols including ethylene glycol, diethylene glycol, triethyleneglycol, propane diols, butane diols, pentane diols, hexane diols, octane diols; thioglycol; honey or mixtures thereof.

In one embodiment, the humectant is glycerine (glycerol) and is used in the watercolour paint compositions disclosed herein. The glycerine acts as a humectant and it does not impede the reaction when an aqueous solution of a weak acid is used to neutralize the watercolor composition to "fix" the watercolour painting thereby ensuring it is water resistant.

In one embodiment the humectant is glycerine and is added in an amount of about 10-25 15-25 10 kg to about 15 kg per 100 L of the watercolour paint composition.

It is well within the skill of the addressee to determine the appropriate quantity of humectant to be used using routine trial and experimentation.

Thickener

One or more alkali soluble thickeners or alkali swellable thickeners are included in the watercolour paint composition of the present invention. Such thickeners typically comprise the aqueous emulsion reaction product of an unsaturated carboxylic acid monomer, e.g., methacrylic acid; a monoethylenically unsaturated monomer different from the carboxylic acid monomer, e.g. ethyl acrylate; a macromonomer comprising a hydrophobic portion and an alkoxylated portion which is polymerizable with the other monomers; and a monomer having latent crosslinking functionality. Suitable thickeners include Rheovis, manufactured by BASF, UCAR 146 and UCAR Polyphobe TR115, manufactured by Union Carbide and Acrysol DR-1, Acrysol DR-73, Acrysol ASE 60 and Acrysol TT615 manufactured by The Dow Chemical Company.

The thickeners may be varied depending on the main pigments being used in order to get a uniform viscosity. The selection of alkali soluble or alkali swellable thickener and the quantity to be used for the composition of the present invention is within the skill of the person skilled in the art using routine trial and experimentation.

Pigment

One or more pigments may be included in the composition. Pigmentation provides colour and opacity and may contribute to other properties of the paint composition. A person skilled in the art will be aware that pigment particle size and shape, ease of wettability or properties relating to specific density contribute to the viscosity and application characteristics of the wet paint composition and ultimately properties of the dried paint coatings. A person skilled in the art will therefore appreciate that the choice of pigment will have an effect on the choice of other ingredients such as thickeners.

It is well within the skill of the addressee to determine the appropriate selection of pigment and the quantity to be used using routine trial and experimentation.

Colour pigments may be organic or inorganic compounds, natural or synthetic and these may be used separately or in combination. Titanium dioxide is a common white pigment with a high refractive index and excellent hiding power (the ability to render a paint opaque). It is frequently used with both coloured organic and inorganic pigments. Iron oxides range in colour from yellow and red to brown and black. Azo pigments are a common class of organic colour pigments. Pigments called "extender" pigments may be used in conjunction with other pigments. The use of extender pigments reduces shrinkage stresses within the paint film and increases the pigment volume content at relatively low cost. Extender pigments include those based on carbonates, silicates, sulfates, barytes and mica. The use of extender pigments aids in viscosity and flow control and reinforces the dry film strength.

Dispersant

The composition of the present invention may include one or more dispersants. These are conventional ingredients used to enhance pigment loading and dispersion stability. The dispersant may be nonionic or anionic surfactants. Anionic surfactants are preferred. Examples of suitable anionic emulsifiers include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly (39) ethoxyethyl sulfate.

Suitable anionic surfactants are manufactured by The Dow Chemical Company under the trade marks Orotan 1124, Orotan 1288, Orotan 731 DP and Orotan 850.

The skilled addressee is able to determine the appropriate selection of dispersants and the quantity to be used using routine trial and experimentation.

Other Additives

The composition also optionally includes one or more conventional additives such as rheology modifiers, extenders (such as calcium carbonate), dispersants, wetting agents, biocides, preservatives, defoamers, brighteners, colloidal clays (such as Attagel 50) or mixtures thereof.

Using the Watercolour Composition

As previously discussed, the watercolour paint composition as disclosed herein behaves as a traditional watercolour paint would in that it can be re-solubilized with water and applied to a support surface, such as paper, board, canvas and the like. However, unlike traditional watercolour paints, a major advantage of the watercolour paint composition of the present invention is that after application, the resulting painting can be treated, typically by spraying, with an aqueous solution of weak acid (such as acetic acid) to neutralise the watercolour paint composition. As a result, the paint instantly becomes water resistant without impeding further layering of the watercolour painting or leaving any visible film or trace.

In practice, when the aqueous solution of weak acid is applied it begins acting immediately to neutralise and "fix" the watercolour painting to the support surface. The excess weak acid solution can then be washed off with water, for example using a paint brush or by placing the painting under a tap. Alternatively, the excess weak acid solution may be wiped off with a cloth or tissue.

As a result, subsequent layer or layers of watercolour paint can be applied, without re-dissolving the first layer of paint or causing discolouration of the subsequent layer or layers of paint. A treated layer of paint may be painted over while it is still damp, or the treated layer may be dried off by allowing to evaporate over time, or by using a hair dryer and the like to accelerate the drying process. Importantly, if there is any residue of the excess weak acid solution left on the surface of the painting it may coagulate fresh paint when applied over the top of it.

In one embodiment, the aqueous solution of weak acid is selected from the group consisting of acetic acid, citric acid, tartaric acid, malic acid, fumaric acid, lactic acid and trichloroacetic acid.

In a preferred embodiment, the aqueous solution of weak acid is acetic acid. In one form, the aqueous solution of acetic acid is formulated by taking about 5 kg to about 10 kg of acetic acid (90%) and diluting with about 95 kg of water. In one form the aqueous solution of acetic acid is formulated by taking about 5 kg, about 6 kg, about 7 kg, about 8 kg, about 9 kg or about 10 kg of acetic acid (90%) and diluting with about 95 kg of water. In a preferred embodiment the aqueous solution of acetic acid is formulated by taking about 5 kg of acetic acid (90%) and diluting with about 95 kg of water.

It is well within the skill of the addressee to determine other appropriate weak acids and the concentration to be used using routine trial and experimentation.

As discussed above, in another form of the invention the watercolour paint composition may comprise a pH stabilizer which slowly evaporates over a period of at least one day. In which case, after application the water colourist can choose to either spray the watercolour painting with acid to instantly fix the layer of paint, or leave the watercolour painting for a sufficient period of time to evaporate the pH stabilizer thereby fixing the under layer before building up subsequent layers of the painting.

Therefore, the water colourist may use as many layers of the watercolour paint as they choose and "fix" a layer of their painting at will, painting over the fixed layer or layers to conceptualise their painting without having to acquire the deftness and swiftness of application which is currently required to complete a watercolour painting without re-dissolving the under layer(s) or discolouring the subsequent layer.

Amateur water colourists when applying a wash (a thin layer of paint spread over a large area of the painting) over a layer or layers of a watercolour painting can often overdo it and are not experienced enough to fix their mistakes. However, using the watercolour composition and process described herein, the amateur water colourist can swab off some of their excess colour or simply wash it off and try again without losing the underpainting layer or layers.

The watercolour composition disclosed herein may be in the form of any traditional watercolour paint. In one embodiment, the watercolour paint composition is formulated as a solid block of paint in a pan and is ready to use on application of water with a wet brush. If the watercolour paint composition is formulated in a pan, the non-volatile pH stabilizer does not evaporate after any length of time.

In another embodiment, the watercolour paint composition is formulated as a paste in a tube. In use, a tube watercolour is diluted with water on a palette for easy mixing. If a tube watercolour paint of the invention dries out on a palette, it can generally be simply re-wetted with a brush or spray bottle for subsequent use.

Example Embodiments

1. A watercolour paint composition comprising:
    at least one pigment in an effective amount to provide the desired pigmentation;
    one or more humectants;
    a binder selected from one or more alkali soluble polymers; and
    a pH stabilizer in an amount effective to adjust the mixture to an alkaline pH so that the watercolour paint composition is water soluble.

2. A watercolour paint composition of item 1 consisting essentially of:
    at least one pigment in an effective amount to provide the desired pigmentation;
    one or more humectants;
    a binder selected from one or more alkali soluble polymers; and
    a pH stabilizer in an amount effective to adjust the mixture to an alkaline pH so that the watercolour paint composition is water soluble.

3. The watercolour paint composition according to item 1 or 2, wherein the alkali soluble polymer is based on one or more of the group of polymers consisting of acrylic polymers, acrylic copolymers, styrene polymers and styrene acrylic copolymers.

4. The watercolour paint composition according to any one of item 1-3, wherein the alkali soluble polymer is a waterborne acrylic copolymer comprising carboxylic acid functional monomers, hydroxyl functional monomers or mixtures thereof.

5. The watercolour paint composition according to any one of items 1-4, wherein the alkali soluble polymer has a molecular weight in the range of about 1000 to about 100,000 Dalton.

6. The watercolour paint composition according to item 5, wherein the alkali soluble polymer has a molecular weight in the range of from 1,000-5,000, 5000-10,000; 10,000-15,000, 15,000-20,000, 20,000-25,000, 25,000-30,000, 30,000-35,000, 35,000-40,000, 40,000-45,000, 45,000-50,000, 50,000-55,000, 55,000-60,000, 60,000-65,000, 65,000-70,000, 70,000-75,000, 75,000-80,000, 80,000-85,000, 85,000-90,000, 90,000-95,000, or 95,000-100,000 Dalton.

7. The watercolour paint composition according to item 5 or item 6, wherein the alkali soluble polymer has a molecular weight of about 15,000 Dalton.

8. The watercolour paint composition according to item 5 or item 6, wherein the alkali soluble polymer has a molecular weight of about 30,000 Dalton.

9. The watercolour paint composition according to item 5 or item 6, wherein the alkali soluble polymer has a molecular weight of about 35,000 Dalton.

10. The watercolour paint composition according to any one of items 2-9, wherein the alkali soluble polymer has an acid number of about 70 to about 250.

11. The watercolour paint composition according to item 10, wherein the alkali soluble polymer has an acid number in the range of from 70-100, 100-150, 150-200, or 200-250.

12. The watercolour paint composition according to item 10 or 11, wherein the acid number is about 100.

13. The watercolour paint composition according to item 10 or 11, wherein the acid number is about 80.

14. The watercolour paint composition according to item 10 or 11, wherein the acid number is about 130.

15. The watercolour paint composition according to item 10 or 11, wherein the acid number is about 160.

16. The watercolour paint composition according to any one of items 1-4, wherein the alkali soluble polymer comprises a waterborne acrylic copolymer with carboxylic acid and hydroxyl functional monomers in a colloidal dispersion with a solids content in the range of 49-51%, a water content of 49-51% and a pH from 2.5-3.5.

17. The watercolour paint composition according to item 16, wherein the alkali soluble polymer has a solids content of about 50%, a pH of about 3, a glass transition temperature (Tg) of about 45° C. and an acid number of about 100.

18. The watercolour paint composition according to item 16, wherein the alkali soluble polymer has a solids content of about 50%, a pH of about 3.5, a glass transition temperature (Tg) of about 45° C. and an acid number of about 100.

19. The watercolour paint composition according to item 16, wherein the alkali soluble polymer has a solids content of about 30%, a pH of about 3.5, a glass transition temperature (Tg) of about 45° C. and an acid number of about 100.

20. The watercolour paint composition according to item 16, wherein the alkali soluble polymer has a molecular weight of about 15,000, a pH of about 3, an acid number of about 100 and a glass transition temperature (Tg) of about 45° C.

21. The watercolour paint composition according to any one of items 1-4, wherein the alkali soluble polymer comprises a styrene acrylic copolymer colloidal dispersion with a solids content of about 48%, a pH of about 3.5, a glass transition temperature (Tg) of about 73° C. and an acid number of about 160.

22. The watercolour paint composition according to any one of items 1-4, wherein the alkali soluble polymer comprises a styrene acrylic copolymer colloidal dispersion with a a pH of from 5.6-6.4, a glass transition temperature (Tg) of about 10° C. and an acid number of about 130.

23. The watercolour paint composition according to any one of items 1-4, wherein the alkali soluble polymer comprises a carboxylated acrylic copolymer colloidal dispersion with a solids content of about 50%, a pH of about 2.5, a glass transition temperature (Tg) of about 105° C. and an acid number of about 136.

24. The watercolour paint composition according to any one of items 1-4, wherein the alkali soluble polymer comprises a carboxylated acrylic copolymer colloidal dispersion with a solids content of about 50%, a pH of about 2.5, a glass transition temperature (Tg) of about 125° C. and an acid number of about 130.

25. The watercolour paint composition according to any one of items 1-4, wherein the alkali soluble polymer comprises an aqueous solution based on a carboxylated acrylic copolymer with a solids content of about 30%, a pH of about 8.3, a glass transition temperature (Tg) of about 35° C. and an acid number of about 80.

26. The water colour paint composition according to any one of items 1 to 25, wherein the alkali soluble polymer is present in an amount of about 5 kg/100 L-70 kg/100 L, about 10 kg/100 L, about 15 kg/100 L, about 20 kg/100 L, about 25 kg/100 L, about 30 kg/100 L, about 35 kg/100 L about 40 kg/100 L, about 45 kg/100 L, about 50 kg/100 L, about 55 kg/100 L, about 60 kg/100 L, about 65 kg/100 L or about 70 kg/100 L.

27. The water colour paint composition according to any one of items 1 to 26, wherein the alkali soluble polymer is present in an amount of about 10 kg/100 L-about 20 kg/100 L, or about 30 kg per 100 L of the watercolour paint composition.

28. The water colour paint composition according to any one of items 1-27, wherein the pH is adjusted with a pH stabiliser to a pH range of about 7 to about 11.

29. The watercolour paint composition according to item 28, wherein the pH range is about 7.5 to about 10.

30. The watercolour paint composition according to item 28, wherein the pH range is about 7.5 to about 9.5

31. The watercolour paint composition according to any one of items 1 to 30, wherein the pH is adjusted with a pH stabiliser to a pH range of about 8.5 to about 9.6.

32. The watercolour paint composition according to item 31, wherein the pH is about 9.

33. The watercolour paint composition according to any one of items 1 to 32, wherein the pH stabilizer has a boiling point of at least about 100° C.

34. The watercolour paint composition according to any one of items 1 to 33, wherein the pH stabilizer has a boiling point in the range of about 100-400° C.; 150-400° C., 160-400° C., 170-400° C., 180-400° C., 180-400° C., 200-400° C., 220-400° C., 240-400° C., 260-400° C., 280-400° C., 300-400° C., 320-400° C., 340-400° C., 360-400° C., 380-400° C., 150-350° C., 160-350° C., 170-350° C., 180-350° C., 180-350° C., 200-350° C., 220-350° C., 240-350° C., 260-350° C., 280-350° C., 300-350° C., 320-350° C., 340-350° C., 150-300° C., 160-300° C., 170-300° C., 180-300° C., 180-300° C., 200-300° C., 220-300° C., 240-300° C., 260-300° C., 280-300° C., 150-250° C., 160-250° C., 170-250° C., 180-250° C., 180-250° C., 200-250° C., 220-250° C., 240-250° C., 150-200° C., 160-200° C., 170-200° C., 180-200° C., 180-200° C., 150-180° C., 160-180° C., 170-180° C.

35. The watercolour paint composition according to any one of items 1 to 33, wherein the pH stabilizer has a boiling point greater than about 400° C.

36. The watercolour paint composition according to any one of items 1 to 33, wherein the pH stabilizer is selected from the group consisting of sodium hydroxide, potassium hydroxide, sodium carbonate, sodium bicarbonate, aminomethylpropanol (AMP), monoethanolamine (MEA), diethanolamine (DEA), triethanolamine (TEA) and mixtures thereof.

37. The watercolour paint composition according to item 36, wherein the pH stabilizer is selected from sodium hydroxide and potassium hydroxide and is preferably potassium hydroxide.

38. The watercolour composition according to item 36, wherein the pH stabilizer is selected from the group consisting of aminomethylpropanol (AMP), monoethanolamine (MEA), diethanolamine (DEA), or triethanolamine (TEA).

39. The watercolour paint composition according to any one of items 1 to 38, wherein the pH stabilizer is in an amount of from about 1 kg to about 2 kg per 100 L of the watercolour paint composition.

40. The watercolour paint composition according to any one of items 1 to 39, wherein the one or more humectants are selected from the group consisting of triols including glycerol, 1,2,6-hexanetriol, trimethylolpropane, alkoxylated triols, saccharides and sugar alcohols; and diols including ethylene glycol, diethylene glycol, triethyleneglycol, propane diols, butane diols, pentane diols, hexane diols, octane diols; thioglycol; honey or mixtures thereof.

41. The watercolour paint composition according to any one of items 1 to 40, wherein the humectant is glycerine and is present in an amount of about 10 kg to about 15 kg per 100 L of the watercolour paint composition.

42. The water colour paint composition according to any one of items 1 to 41, further comprising one or more thickeners, rheology modifiers, extenders, dispersants, wetting agents, biocides, defoamers, brighteners, colloidal clays or mixtures thereof.

43. The watercolour paint composition according to any one of items 1 to 42 when used to paint a water colour painting.

44. A method of providing a watercolour painting comprising,
applying the watercolour paint composition of any one of items 1-42 to a support to form one or more layers of paint composition with an outer layer of paint composition,
applying a sufficient amount of a weak acid to the outer layer of paint composition so as to neutralise the outer layer of paint composition and provide a water resistant layer of the paint composition.

45. The method according to item 44, wherein the weak acid is in an aqueous solution and is selected from the group consisting of acetic acid, citric acid, tartaric acid, malic acid, fumaric acid, lactic acid and trichloroacetic acid.

46. The method according to item 44 or item 45, wherein the weak acid is an aqueous solution of acetic acid.

47. The method according to any one of items 44-46, wherein further paint composition is applied over the water resistant paint composition and subsequently neutralised with the weak acid.

48. A method of providing a watercolour painting comprising,
applying the watercolour paint composition according to any one of items 1-42 to a support, and
allowing the applied paint composition to dry for a sufficient period of time to evaporate the pH stabilizer from the paint composition to provide a water resistant paint composition.

49. The method of item 48, wherein the paint is dried under normal temperature and pressure for a period of time of at least one day.

50. A process of fixing a watercolour painting comprising the steps of:
a) applying the watercolour paint composition according to any one of items 1-42 to a support to produce one or more layers of the watercolour paint composition having an outer layer of paint composition;
b) treating the outer layer of the watercolour paint composition with an aqueous solution of a weak acid in an amount effective to neutralise the outer layer of watercolour paint composition to provide a water resistant paint composition;
c) removing any excess weak acid; and
d) optionally repeating steps a) to c) to build up subsequent layers of the watercolour paint composition to form the watercolour painting.

51. A process for fixing a watercolour painting on a support comprising the steps of:
a) applying the watercolour paint composition according to any one of items 1-41 to the support to produce a first layer of the watercolour painting;
b) treating the first layer of the watercolour painting with an aqueous solution of a weak acid in an amount effective to neutralise the first layer of watercolour paint composition and make it water resistant without leaving a visible film;
c) removing the excess weak acid; and
d) optionally repeating steps a) to c) to build up subsequent layers of the watercolour painting.

52. The process according to claim 50 or 51, wherein in step b) the aqueous solution of weak acid is sprayed onto the watercolour painting.

53. The process according to item 50, 51 or 52, wherein the aqueous solution of weak acid is selected from the group consisting of acetic acid, citric acid, tartaric acid, malic acid, fumaric acid, lactic acid and tricloroacetic acid.

54 The process according to any one of items 50-53, wherein the weak acid is acetic acid.

55. The method of items 44-49 and the process of items 50-54 wherein the pH stabiliser is potassium hydroxide and the weak acid is acetic acid.

Modes for Carrying Out the Invention

In order to better understand the nature of the invention a watercolour paint composition of the present invention may be formulated as indicated in Example 1-7.

The following commercially available products are suitable for the watercolour compositions:

| Ingredient (manufacturer) | Ingredient Function |
|---|---|
| F/Brite Yellow 11811/82(Chromaflow Technologies Aust) | Pigment |
| Acrysol I-62 (The Dow Chemical Company) Solids content about 50%, pH 3.5 | Binder (alkali soluble polymer) |
| Rheovis (BASF) | Thickener |
| Acrysol TT615(The Dow Chemical Company) Solids content About 30%, pH 2.2-2.3 | Thickener |
| Glycerine (Redox Chemicals) | Humectant |
| Omyacarb 2 (Omya Southern) | Extender |
| Oratan 1124 (The Dow Chemical Company) | Dispersant |
| Water | |
| Surfynol CT 171(IMCD) | Wetting Agent |
| Potassium Hydroxide (Redox Chemicals) crystalline form | pH Stabilizer |
| Sodium hydroxide available from Sigma Aldrich)crystalline form | pH Stabilizer |
| Sodium carbonate (Sigma Aldrich) | pH Stabilizer |
| Sodium bicarbonate | pH Stabilizer |

| Ingredient (manufacturer) | Ingredient Function |
|---|---|
| Actice DW, Acticide MBS (Thor Industries) | Acticide/Biocide |
| AMP (aminomethylpropanol available from Sigma Aldrich) | pH Stabilizer |
| MEA (monoethanolamine available from Sigma Aldric) | pH Stabilizer |
| DEA (dethanolamine) available from Sigma Aldrich) | pH Stabilizer |
| TEA (triethanolamine) (Sigma Aldrich) | pH Stabilizer |
| Foamaster | Defoamer |

Example 1

| Ingredient (manufacturer) | Ingredient Function | Quantity (kg/100 L) |
|---|---|---|
| F/Brite Yellow 11811/82(Chromaflow Technologies Aust) | Pigment | 30.8 kg |
| Acrysol I-62 (The Dow Chemical Company) | Binder (alkali soluble polymer) | 30 kg |
| Rheovis (BASF) | Thickener | 2.0 kg |
| Acrysol TT615(The Dow Chemical Company) | Thickener | 1.5 kg |
| Glycerine (Redox Chemicals) | Humectant | 10 kg |
| Omyacarb 2 (Omya Southern) | Extender | 12.5 kg |
| Oratan 1124 (The Dow Chemical Company) | Dispersant | 0.56 kg |
| Water | | 25 kg |
| Surfynol CT 171(IMCD) | Wetting Agent | 0.19 kg |
| Potassium Hydroxide (Redox Chemicals) | PH Stabilizer | 1.3 kg |
| Actice DW, Acticide MBS (Thor Industries) | Acticide/Biocide | 0.3 kg |
| Foamaster | Defoamer | 0.15 kg |

Example 2

| Ingredient (manufacturer) | Ingredient Function | Quantity (kg/100 L) |
|---|---|---|
| Cadmium Yellow F121(Rockwood Pigments) | Pigment | 50 kg |
| Acrysol I-62 (The Dow Chemical Company) | Binder (alkali soluble polymer) | 30 kg |
| Rheovis (BASF) | Thickener | 3 kg |
| Acrysol TT615(The Dow Chemical Company) | Thickener | 1.5 kg |
| Glycerine (Redox Chemicals) | Humectant | 10 kg |
| Oratan 1124 (The Dow Chemical Company) | Dispersant | 1.5 kg |
| Water | | 15 kg |
| Surfynol CT 171(IMCD) | Wetting Agent | 0.5 kg |
| Potassium Hydroxide (Redox Chemicals) | PH Stabilizer | 1.5 kg |
| Actice DW, Acticide MBS (Thor Industries) | Acticide/Biocide | 0.15 kg |
| Foamaster | Defoamer | 0.15 kg |

Example 3

| Ingredient (manufacturer) | Ingredient Function | Quantity (kg/100 L) |
|---|---|---|
| Ultra Blue 05 XSR(Talson) | Pigment | 30 kg |
| Acrysol I-62 (The Dow Chemical Company) | Binder (alkali soluble polymer) | 30 kg |
| Rheovis (BASF) | Thickener | 3.5 kg |
| Acrysol TT615(The Dow Chemical Company) | Thickener | 1.5 kg |
| Glycerine (Redox Chemicals) | Humectant | 10 kg |
| Water | | 10 kg |
| Potassium Hydroxide (Redox Chemicals) | PH Stabilizer | 1.5 kg |
| Actice DW, Acticide MBS (Thor Industries) | Acticide/Biocide | 0.3 kg |
| Foamaster | Defoamer | 0.15 kg |

Example 4

| Ingredient (manufacturer) | Ingredient Function | Quantity (kg/100 L) |
|---|---|---|
| Aquatal White CA120(Talson) | Pigment | 83 kg |
| Acrysol I-62 (The Dow Chemical Company) | Binder (alkali soluble polymer) | 30 kg |
| Rheovis (BASF) | Thickener | 2.0 kg |
| Acrysol TT615(The Dow Chemical Company) | Thickener | 1.0 kg |
| Glycerine (Redox Chemicals) | Humectant | 10 kg |
| Water | | 10 kg |
| Potassium Hydroxide (Redox Chemicals) | PH Stabilizer | 1.8 kg |
| Actice DW, Acticide MBS (Thor Industries) | Acticide/Biocide | 0.3 kg |
| Foamaster | Defoamer | 0.15 kg |

Example 5

| Ingredient (manufacturer) | Ingredient Function | Quantity (kg/100 L) |
|---|---|---|
| Raw Umber 402 (Hoover Pigments) | Pigment | 37.5 kg |
| Acrysol I-62 (The Dow Chemical Company) | Binder (alkali soluble polymer) | 30 kg |
| Rheovis (BASF) | Thickener | 3.0 kg |
| Acrysol TT615(The Dow Chemical Company) | Thickener | 1.0 kg |
| Glycerine (Redox Chemicals) | Humectant | 10 kg |
| Oratan 1124 (The Dow Chemical Company) | Dispersant | 1.13 kg |
| Water | | 40 kg |
| Surfynol CT 171(IMCD) | Wetting Agent | 0.38 kg |
| Potassium Hydroxide (Redox Chemicals) | PH Stabilizer | 1.8 kg |
| Actice DW, Acticide MBS (Thor Industries) | Acticide/Biocide | 0.3 kg |
| Foamaster | Defoamer | 0.15 kg |

Example 6

| Ingredient (manufacturer) | Ingredient Function | Quantity (kg/100 L) |
|---|---|---|
| Yellow 110NO(Hoover Pigments) | Pigment | 37.5 kg |
| Acrysol I-62 (The Dow Chemical Company) | Binder (alkali soluble polymer) | 30 kg |
| Rheovis (BASF) | Thickener | 3.5 kg |
| Acrysol TT615(The Dow Chemical Company) | Thickener | 1.0 kg |
| Glycerine (Redox Chemicals) | Humectant | 10 kg |
| Oratan 1124 (The Dow Chemical Company) | Dispersant | 1.13 kg |
| Water | | 40 kg |
| Surfynol CT 171(IMCD) | Wetting Agent | 0.38 kg |
| Potassium Hydroxide (Redox Chemicals) | PH Stabilizer | 1.5 kg |
| Actice DW, Acticide MBS (Thor Industries) | Acticide/Biocide | 0.3 kg |
| Foamaster | Defoamer | 0.15 kg |

Example 7

| Ingredient (manufacturer) | Ingredient Function | Quantity (kg/100 L) |
|---|---|---|
| F/Brite Pink 304/80(Chromaflow Technologies Aust) | Pigment | 9.1 kg |
| Acrysol I-62 (The Dow Chemical Company) | Binder (alkali soluble polymer) | 30 kg |
| Rheovis (BASF) | Thickener | 4.0 kg |
| Acrysol TT615(The Dow Chemical Company) | Thickener | 1.5 kg |
| Glycerine (Redox Chemicals) | Humectant | 10 kg |
| Omyacarb 2 (Omya Southern) | Extender | 12.5 kg |
| Oratan 1124 (The Dow Chemical Company) | Dispersant | 2.25 kg |
| Water | | 45 kg |
| Surfynol CT 171(IMCD) | Wetting Agent | 0.75 kg |
| Potassium Hydroxide (Redox Chemicals) | PH Stabilizer | 1.5 kg |
| Actice DW, Acticide MBS (Thor Industries) | Acticide/Biocide | 0.3 kg |
| Foamaster | Defoamer | 0.15 kg |

Similar compositions according to Examples 1-7 can be formulated with sodium hydroxide, AMP or MEA as pH stabiliser. Suffiicent pH stabiliser is added to neutralise the mixture to about pH 9.

Example 8—Weak Acid Solution

The Weak acid solution used to neutralise the watercolour paint composition disclosed herein, thereby waterproofing the watercolour paint is formulating by diluting 5 kg of acetic acid (90%, supplied by Nuplex Industries) with 95 kg of water. It will be appreciated that variations of this dilution may be employed.

General Procedure for Formulating the Watercolour Composition

The watercolour paint making process is the same for any colour and is the conventional procedure which may be summarised as follows.

Stage 1: Dilute pigment, either in powder form, or possibly as a pre-dispersed liquid which has already been processed in a bead mill with a workable amount of water.

Stage 2: Load: dispersants, extenders, wetting agents, biocides, preservatives, brighteners and defoamer as required to control against foam.

Stage 3: Load: Alkali soluble polymer (such as Acrysol I-62, if using) under agitation using a cavitation mixer such as a TORRACE mixer, add enough pH stabilizer, to neutralize this mixture to desired pH, add more defoamer as needed to control against foam.

Stage 4: Add sufficient water to make 100 L and thickener to achieve the desired viscosity. Stir until the batch is uniform.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of providing a watercolour painting comprising,
    applying a watercolour paint composition comprising at least one pigment in an effective amount to provide the desired pigmentation; one or more humectants; a binder selected from one or more alkali soluble polymers; and a pH stabilizer in an amount effective to adjust the mixture to an alkaline pH so that the watercolour paint composition is water soluble to a support,
    applying a sufficient amount of an acid selected from the group consisting of acetic acid, citric acid, tartaric acid, malic acid, fumaric acid, lactic acid and trichloroacetic acid to the applied paint composition so as to neutralise the paint composition and provide a water resistant paint composition.

2. The method according to claim 1, wherein the acid is in an aqueous solution.

3. The method according to claim 1, wherein further paint composition is applied over the water resistant paint composition and subsequently neutralised with the acid.

4. The method of claim 1 wherein the pH stabilizer is selected from one or more of the group of potassium hydroxide (KOH), sodium hydroxide (NaOH), sodium carbonate ($Na_2CO_3$) and sodium bicarbonate ($NaHCO_3$).

5. A process of fixing a watercolour painting comprising the steps of:
    a) applying a watercolour paint composition comprising at least one pigment in an effective amount to provide the desired pigmentation; one or more humectants; a binder selected from one or more alkali soluble polymers; and a pH stabilizer in an amount effective to adjust the mixture to an alkaline pH so that the watercolour paint composition is water soluble, to a support to produce one or more layers of the watercolour paint composition having an outer layer of paint composition;
    b) treating the outer layer of the watercolour paint composition with an aqueous solution of an acid selected from the group consisting of acetic acid, citric acid, tartaric acid, malic acid, fumaric acid, lactic acid and trichloroacetic acid in an amount effective to neutralise the outer layer of watercolour paint composition to provide a water resistant paint composition;
    c) removing any excess acid; and
    d) optionally repeating steps a) to c) to build up subsequent layers of the watercolour paint composition to form the watercolour painting.

6. The method of claim 5 wherein the pH stabilizer is selected from one or more of the group of potassium hydroxide (KOH), sodium hydroxide (NaOH), sodium carbonate ($Na_2CO_3$) and sodium bicarbonate ($NaHCO_3$).

7. A process for fixing a watercolour painting on a support comprising the steps of:
    a) applying a watercolour paint composition comprising at least one pigment in an effective amount to provide the desired pigmentation; one or more humectants; a binder selected from one or more alkali soluble polymers; and a pH stabilizer in an amount effective to adjust the mixture to an alkaline pH so that the watercolour paint composition is water soluble to the support to produce a first layer of the watercolour painting;
    b) treating the first layer of the watercolour painting with an aqueous solution of an acid selected from the group consisting of acetic acid, citric acid, tartaric acid, malic acid, fumaric acid, lactic acid and trichloroacetic acid in an amount effective to neutralise the first layer of watercolour paint composition and make it water resistant without leaving a visible film;
    c) removing the excess acid; and
    d) optionally repeating steps a) to c) to build up subsequent layers of the watercolour painting.

8. The method of claim 7 wherein the pH stabilizer is selected from one or more of the group of potassium hydroxide (KOH), sodium hydroxide (NaOH), sodium carbonate ($Na_2CO_3$) and sodium bicarbonate ($NaHCO_3$).

* * * * *